United States Patent [19]

Shell

[11] 3,985,707

[45] Oct. 12, 1976

[54] PROPYLENE OXIDE COPOLYMER COMPOSITION

[75] Inventor: Robert L. Shell, Akron, Ohio

[73] Assignee: The Goodyear Tire & Rubber Company, Akron, Ohio

[22] Filed: June 23, 1975

[21] Appl. No.: 589,171

Related U.S. Application Data

[63] Continuation of Ser. No. 344,311, March 23, 1973, abandoned, which is a continuation-in-part of Ser. No. 179,176, Sept. 9, 1971, abandoned.

[52] U.S. Cl. .......................... 260/45.75 N; 260/2 A; 260/45.8 N; 260/79.5 P
[51] Int. Cl.$^2$ ..................... C08K 5/39; C08G 23/06
[58] Field of Search.................. 260/79.5 R, 79.5 P, 260/45.8 N, 45.75 N, 88.3, 80.3, 2 A, 183

[56] References Cited

UNITED STATES PATENTS

| | | | |
|---|---|---|---|
| 3,370,035 | 2/1968 | Ogura | 260/45.75 |
| 3,442,876 | 5/1969 | Herold | 260/80.3 |
| 3,634,315 | 1/1972 | Hattori | 260/45.8 N |

*Primary Examiner*—Christopher A. Henderson
*Attorney, Agent, or Firm*—F. W. Brunner; H. C. Young, Jr.

[57] ABSTRACT

A composition comprising a rubbery copolymer of propylene oxide in admixture with a heat age resisting mixture of a nickel dialkyl dithiocarbamate and an imidazole where the ratio of the carbamate units to imidazole units is in the range of from about 16:1 to about 1:40. The composition has particular utility for providing a rubbery copolymer of propylene oxide having improved resistance to heat aging in a temperature range of about 100°C. to about 170°C.

8 Claims, No Drawings

PROPYLENE OXIDE COPOLYMER COMPOSITION

This is a continuation of application Ser. No. 344,311, filed Mar. 23, 1973, which was a continuation-in-part of application Ser. No. 179,176, filed Sept. 9, 1971.

This invention relates to rubbery copolymers of propylene oxide with other monomers and particularly relates to a mixture of such rubbery copolymers with the mixture of a metal dialkyl dithiocarbamate and 2-mercaptobenzimidazole or a derivative of 2-mercaptobenzimidazole.

Various rubbery copolymers of propylene oxide have particular utility in various commercial articles primarily because they have rubber-like properties over a wide range of temperatures. This is primarily because of their low glass transition temperature. Thus, articles prepared from such copolymers are typically useful in arctic conditions as well as at tropical temperatures.

However, these rubbery copolymers generally heat age at too great a rate at elevated temperatures, such as above about 135° C., to be commercially useful for many purposes which require exposure to such elevated temperatures over a long period of time. Various metal dialkyl dithiocarbamates have been used to inhibit such heat aging, but it is desired in a number of commercial applications that further improved heat aging be provided.

Therefore, it is an object of this invention to provide a rubbery propylene oxide copolymer composition which can be used at a temperature of at least about 135° C. and preferably at least about 150° C. for an extended period of time.

In accordance with this invention, a mixture has been discovered comprising a rubbery copolymer of propylene oxide having a molecular weight of at least about 500,000 in admixture with a heat age resisting amount of a metal dialkyl dithiocarbamate and at least one imidazole selected from 2-mercaptobenzimidazole and its metal salt, where the mole ratio of carbamate units to imidazole units is in the range of about 16:1 to about 1:40 and preferably about 8:1 to about 1:25, where the alkyl radical contained in the dithiocarbamate is intended to include cycloalkyl radicals and contains 1 to 8 carbon atoms, and where the polymer or copolymer of propylene oxide contains from about 70 to about 97 mole percent, preferably 85 to about 95 percent units, derived from propylene oxide, and correspondingly from about 30 to about 3, preferably about 15 to 5, percent units derived from monomers selected from allyl glycidyl ether and unsaturated monoepoxides containing 3 to about 10 carbon atoms, such as 1,7-octadiene monoepoxide, 1,6-heptadiene monoepoxide, 1,4-pentadiene monoepoxide, 1,5-hexadiene monoepoxide, 1,3-butadiene monoepoxide. Allyl glycidyl ether is preferred.

In the practice of this invention, it is preferred that at least about 0.5 and preferably at least about one part by weight up to about 20 parts by weight of the heat age resisting mixture be mixed with 100 parts by weight of the propylene oxide copolymer, although larger amounts can be used with little increase in beneficial results.

For example, the heat age resistor mixture corresponding to carbamate/imidazole units mole ratios of 16:1 to 1:40 can comprise a weight ratio of nickel dibutyl dithiocarbamate (NBC) to 2-mercaptobenzimidazole (MBI) of about 96:4 to about 4:96 and preferably about 92:8 to about 8:92 for a unit ratio of 8:1 to 1:25. Furthermore, a mole ratio of NBC to Te(MBI)$_4$ of 1:1 would represent a unit ratio of carbamate to imidazole of 1:2. It has been found unexpectedly that such a heat age resistor mixture is synergistic in nature by providing a heat age resistance greater than the sum of the compound at the same resistor level in the propylene oxide polymer or copolymer. This synergistic effect is particularly evidenced by the more preferred carbamate/imidazole unit ratios of about 8:1 to about 1:25 in total amounts of the mixture in the range of about 1 to to about 20 parts by weight per 100 parts by weight (phr) of the propylene oxide polymer or copolymer.

The metal dialkyl dithiocarbamate used in this invention are metal salts of dialkyl dithiocarbamic acids and generally represented by the following formula:

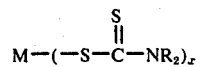

where M is the metal having a valence of from 1 to 4; R is the alkyl radical; and x is equal to the valence of the metal M.

Various metals can be used for the carbamate used in this invention, representative of which are sodium, cadmium, barium, calcium, copper, gold, silver, zinc, titanium, chromium, manganese, nickel, molybdenum, ruthenium, rhodium, palladium, cobalt, bismuth, selenium, lead and tellurium. Nickel is preferred, the other metals generally being much less effective.

Representative of alkyl radicals for the carbamate are saturated alkyl radicals, such as methyl, ethyl, n-propyl, isopropyl, n-butyl, isobutyl, t-butyl, pentyl, isopentyl, hexyl, isohexyl, t-hexyl, 2-ethyl hexyl, octyl and cyclohexyl radicals.

Representative of various metal dialkyl dithiocarbamates are, for example, bismuth diethyl dithiocarbamate, lead diethyl dithiocarbamate, cupric diethyl dithiocarbamate, tellurium diethyl dithiocarbamate, selenium diethyl dithiocarbamate, zinc diethyl dithiocarbamate, nickel dibutyl dithiocarbamate, zinc dibutyl dithiocarbamate, nickel dipentyl dithiocarbamate, sodium diethyl dithiocarbamate, barium dibutyl dithiocarbamate, calcium dimethyl dithiocarbamate, cupric dimethyl dithiocarbamate, zinc dibutyl dithiocarbamate, cadmium diisopropyl dithiocarbamate, chromium diethyl dithiocarbamate, manganese dibutyl dithiocarbamate, molybdenum dibutyl dithiocarbamate, and palladium dibutyl dithiocarbamate. The nickel dibutyl dithiocarbamate is preferred, others generally much less effective.

The salts of 2-mercaptobenzimidazole are understood to have the following general formula:

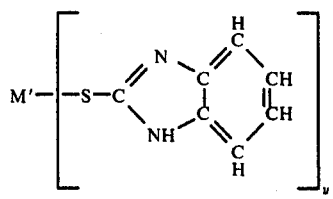

where M' is preferably a metal having a valence of from 1 to 4, preferably 2, and y is equal to the valence of the metal M'.

These metal salts are of the type which can be prepared by first reacting at about 20° to about 50° C. an excess of 2-mercaptobenzimidazole with sodium hydroxide in water to form the soluble sodium salt. The insoluble mercaptobenzimidazole is filtered from the solution and the sodium salt is reacted with a metal chloride forming the metal salt plus the water soluble sodium chloride. The metal salt precipitate is than removed and used in the age resistor mixture.

Various metals can be used for the metal salt of 2-mercaptobenzimidazole, representative of which are nickel, lithium, potassium, manganese, zinc, selenium, sodium, cadmium, barium, calcium, titanium, chromium, cesium, beryllium, magnesium, cobalt, strontium, lead, mercury, tin, antimony, iron and tellurium. The nickel, iron as a ferric ion, cobalt, manganese, zinc and tin salts are preferred.

The propylene oxide polymers or copolymers used in the mixture of this invention are generally rubbery in nature and characterized by having a glass transition temperature in the range of about −60° C. to about −75° C., and more preferably in the range of about −65° C. to about −70° C. as determined by ASTM test number D746, or the Scott Brittle Point test. The rubbery polymer or copolymers are generally further characterized by having an ultimate tensile strength as measured from a 1/10 inch dumbbell sample on an Instron tensile tester at a crosshead speed at about 5 inches per minute by normal rubber testing procedures of in the range of about 1500 pounds per square inch (psi) to about 3500 psi, with a corresponding ultimate elongation at about 25° C. of in the range of about 200 to about 1100 percent. They generally have a molecular weight of at least about 500,000 and typically in the range of about 750,000 to about 10,000,000.

The rubbery polymers or copolymers of propylene oxide used in the mixture of this invention are generally prepared by copolymerizing the propylene oxide with at least one of the comonomers under suitable and generally recognized polymerization conditions.

In the practice of this invention, the age resisting composition is typically prepared by mixing the copolymer of propylene oxide with the age resisting mixture, although the age resisting mixture can be separated into its two types of components and mixed separately with the copolymer, followed by sulfur-curing. The mixture can be dry mixed on a mill or other relatively dry mixing means sufficient to provide adequate shear to thoroughly mix the materials. Alternately, they can be solution mixed.

The resulting rubbery composition of this invention has particular utility in the fabrication of various industrial products, such as hose and belting which are to be exposed to various conditions over abroad temperature range, such as from about −60° C. to at least about 150° C. and even up to 170° C. or higher. The heat age resisting mixture in this invention particularly enhances the composition's utility in the range of from about 100° C. to about 170° C. wherein the rubbery cured copolymer would otherwise be expected to break down and even disintegrate without the use of a heat age resistor.

The following examples further illustrate the invention and are not intended to be limiting. The parts and percentages are by weight unless otherwise indicated.

EXAMPLE I

Various ratios of nickel dibutyl dithiocarbamate (NBC) and 2-mercaptobenzimidazole (MBI) were mixed with a rubbery polypropylene oxide copolymer on a mixing mill at a level of 13 parts of these materials per 100 parts of rubber (phr), at a temperature of about 125° C. for about 5 minutes. The polypropylene oxide copolymer had a dilute solution viscosity in benzene at 30° C. of about 4 and comprised a mole ratio of units derived from propylene oxide to allyl glycidyl ether of about 93:7. The resulting mixture was cured up as a sheet having a thickness of about 0.074 inch from which were cut 2 × 1/10 inch dumbbells.

The dumbbells were submitted to a heat aging test at 158° C. for various periods of time in a forced draft hot air oven and then submitted to testing with an Instron tensile tester at about 25° C. operated at a crosshead speed of about 2 inches per minute in accordance with ASTM test number D412. The results of the heat aging tests showing the ultimate tensile, tensile at 100 percent and 300 percent modulus as well as ultimate elongation with various ratios of the NBC and MBI mixed with polypropylene oxide copolymer, are exhibited in Table 1.

Table 1

|  | A | B | C | D | E | F | G |
|---|---|---|---|---|---|---|---|
| NBC(phr) | 13 | 11 | 9 | 7 | 3 | 1 | 0 |
| MBI (phr) | 0 | 2 | 4 | 6 | 10 | 12 | 13 |
| UNAGED | | | | | | | |
| 100% modulus (psi) | 240 | 245 | 275 | 270 | 275 | 300 | 260 |
| 300% modulus (psi) | 560 | 665 | 720 | 745 | 775 | 860 | 805 |
| ult. tensile (psi) | 1215 | 1645 | 1675 | 1775 | 1885 | 2100 | 2350 |
| ult. elong. (%) | 600 | 695 | 690 | 655 | 670 | 695 | 790 |
| AGED 168 HOURS AT 158° C. | | | | | | | |
| 100% modulus (psi) | 280 | 335 | 395 | 475 | 570 | 540 | — |
| 300% modulus (psi) | 530 | 745 | 860 | 1020 | 1170 | 1140 | — |
| ult. tensile (psi) | 595 | 975 | 1150 | 1390 | 1410 | 1295 | None |
| ult. elong. (%) | 360 | 435 | 465 | 500 | 410 | 380 | None |
| AGED 336 HOURS AT 158° C. | | | | | | | |
| 100% modulus (psi) | 280 | 340 | 390 | 465 | 540 | 540 | |
| 300% modulus (psi) | — | 600 | 725 | 875 | 890 | — | |
| ult. tensile (psi) | 350 | 660 | 865 | 915 | 910 | 740 | |
| ult. elong. (%) | 200 | 360 | 420 | 335 | 320 | 220 | |

The following information was used for this example:

| Compound | Parts |
|---|---|
| Propylene oxide copolymer | 100 |
| HAF carbon black | 50 |
| Zinc oxide | 22 |
| Stearic acid | 3 |
| Tetramethyl thiuram disulfide | 2.5 |
| Sulfur | 0.5 |
| NBC, MBI, or NBC and MBI | 13 |

The results exhibited in Table 1 show dramatically the synergistic heat age resisting effect of the metal dialkyl dithiocarbamate/2-mercaptobenzimidazole mixture. The tensile strength values are particularly evidentuary.

EXAMPLE II

The zinc derivative or salt of 2-mercaptobenzimidazole (MBI) was prepared and compared to 2-mercaptobenzimidazole as an age resistor for the rubbery polypropylene oxide copolymer used in Example I.

For this example, the following formulation was used:

| Compound | Parts |
|---|---|
| Polypropylene oxide | 100 |
| HAF carbon black | 50 |
| Zinc oxide | 22 |
| Stearic acid | 3 |
| Tetramethyl thiuram disulfide | 2.5 |
| Sulfur | 0.5 |
| Mercaptobenzimidazole and/or zinc salt of MBI | 5 |
| Nickel dibutyl dithiocarbamate (NBC) | 8.3 |

With this mixture was mixed, in experiments identified as H, I and J, various amounts of 2-mercaptobenzimidazole and zinc (2-mercaptobenzimidazole) to give a total age resistor level of about 13.3.

The resulting mixtures were cured up into sheets and tested according to the method of Example I. The results of the test are shown in Table 2.

Table 2

|  | H | I | J |
|---|---|---|---|
| MBI | 5.0 | 2.5 | 0 |
| Zn MBI | 0 | 2.5 | 4.0 |
| UNAGED | | | |
| 100% modulus (psi) | 235 | 235 | 245 |
| 300% modulus (psi) | 685 | 685 | 685 |
| Tensile (psi) | 1735 | 1710 | 1705 |
| Elongation (%) | 680 | 675 | 660 |
| AGED 168 HOURS AT 158° C. | | | |
| 100% modulus (psi) | 430 | 430 | 425 |
| 300% modulus (psi) | 965 | 955 | 1000 |
| Tensile (psi) | 1290 | 1265 | 1290 |
| Elongation (%) | 465 | 450 | 450 |
| AGED 240 HOURS AT 158° C. | | | |
| 100% modulus (psi) | 450 | 410 | 415 |
| 300% modulus (psi) | 945 | 940 | 920 |
| Tensile (psi) | 1180 | 1170 | 1095 |
| Elongation (%) | 455 | 450 | 420 |
| AGED 336 HOURS AT 158° C. | | | |
| 100% modulus (psi) | 435 | 470 | 495 |
| 300% modulus (psi) | 795 | 865 | 925 |
| Tensile (psi) | 935 | 905 | 985 |
| Elongation (%) | 415 | 340 | 335 |

Thus, the zinc salt of 2-mercaptobenzimidazole, when mixed with the nickel dibutyl dithiocarbamate, provided results comparable to the 2-mercaptobenzimidazole.

EXAMPLE III

Various additional metal salts of 2-mercaptobenzimidazole were prepared and compared with the 2-mercaptobenzimidazole according to the method of Example II with the same type of formulation. Five phr of the MBI or its salt was used with 8.3 phr of the NBC. The results are shown in Table 3 as experiments K–R:

Table 3

| 2-mercaptobenzimidazole | K | L | M | N | O | P | Q | R |
|---|---|---|---|---|---|---|---|---|
| MBI | 5 | | | | | | | |
| MBI Salt | | | | | | | | |
| Fe++ | | 5 | | | | | | |
| Fe+++ | | | 5 | | | | | |
| Zn++ | | | | 5 | | | | |
| Co++ | | | | | 5 | | | |
| Mn++ | | | | | | 5 | | |
| Ni++ | | | | | | | 5 | |
| Sn++ | | | | | | | | 5 |
| UNAGED | | | | | | | | |
| 100% modulus | 250 | 270 | 285 | 250 | 205 | 260 | 255 | 280 |
| 300% modulus | 730 | 685 | 720 | 665 | 425 | 720 | 460 | 725 |
| Tensile | 1750 | 1665 | 1820 | 1555 | 850 | 1875 | 700 | 1725 |
| Elongation | 715 | 690 | 715 | 680 | 640 | 715 | 500 | 695 |
| AGED 168 HOURS AT 158° C. | | | | | | | | |
| 100% modulus | 440 | 420 | 475 | 430 | 445 | 470 | 400 | 440 |
| 300% modulus | 925 | 870 | 1070 | 1030 | 945 | 1155 | 880 | 1060 |
| Tensile | 1250 | 1155 | 1170 | 1295 | 1100 | 1405 | 1130 | 1340 |
| Elongation | 470 | 430 | 360 | 415 | 385 | 410 | 440 | 435 |
| AGED 240 HOURS AT 158° C. | | | | | | | | |
| 100% modulus | 345 | 345 | 355 | 350 | 400 | 360 | 320 | 330 |
| 300% modulus | 800 | 720 | 780 | 855 | 810 | 920 | 700 | 810 |
| Tensile | 1150 | 925 | 980 | 1115 | 950 | 1240 | 1005 | 1090 |
| Elongation | 510 | 445 | 430 | 425 | 285 | 465 | 485 | 440 |

Thus, in this invention, the iron, zinc, cobalt, manganese, nickel and tin salts of 2-mercaptobenzimidazole, when used with the nickel dibutyl dithiocarbamate, compared favorably with the 2-mercaptobenzimidazole to provide an improved age resistor mixture. The Experiments O and Q of Example III utilizing the cobalt and nickel salts, provided initial physical properties of the rubber somewhat different from the other salts.

However, they did provide comparable age resistance results as shown in Table 3.

In the description of this invention the salts of the 2-mercaptobenzimidazole for Examples II and III were prepared by first reacting 2-mercaptobenzimidazole at about 25° C. with sodium hydroxide in water to form its sodium salt. Any excess insoluble 2-mercaptobenzimidazole was removed by filtration leaving its soluble sodium salt in the water solution. The sodium salt was then reacted with an excess of a desired metal chloride, forming the metal salt plus sodium chloride. The insoluble metal salt was recovered as a precipitate and the excess metal chloride and the sodium chloride remained in the solution.

In this specification a carbamate unit is defined as:

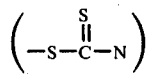

having a unit molecular weight of 90 and an imidazole unit is defined as:

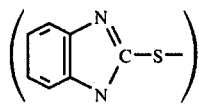

having a unit molecular weight of 149.

EXAMPLE IV

Similar to Example I, various ratios of nickel dibutyl dithiocarbamate (NBC) and 2-mercaptobenzimidazole (MBI) were mixed with the polypropylene oxide copolymer at a level of 13 phr to determine minimal ratios for synergistic heat age resistance effects. The samples for this example were heat aged at 160° C. for 72 and 168 hours respectively before testing. The results of this test are shown in Table 4 as identified by experiments S–Y. These results show that synergistic effects can be observed dramatically with a weight ratio of NBC to MBI as low as about 1:12 and at a minimal ratio of MBI to NBC of about 0.5:12.5 and more dramatically at about 1:12.

Table 4

|  | S | T | U | V | W | X | Y |
|---|---|---|---|---|---|---|---|
| PHR NBC | 13 | 12.5 | 12.0 | 3.0 | 2.0 | 1.5 | 1.0 |
| PHR MBI | — | 0.5 | 1.0 | 10.0 | 11.0 | 11.5 | 12.0 |
| UNAGED |  |  |  |  |  |  |  |
| 100% modulus | 200 | 205 | 200 | 225 | 230 | 250 | 250 |
| 300% modulus | 500 | 490 | 500 | 695 | 720 | 740 | 760 |
| Tensile | 1450 | 1300 | 1290 | 1930 | 2115 | 2040 | 2150 |
| Elongation | 660 | 670 | 665 | 700 | 755 | 705 | 735 |
| AGED 72 HOURS |  |  |  |  |  |  |  |
| 100% modulus | 240 | 250 | 260 | 410 | 420 | 400 | 390 |
| 300% modulus | 500 | 540 | 590 | 1055 | 1085 | 1060 | 1000 |
| Tensile | 660 | 725 | 920 | 1680 | 1690 | 1565 | 1520 |
| Elongation | 430 | 445 | 500 | 545 | 535 | 505 | 520 |
| AGED 168 HOURS |  |  |  |  |  |  |  |
| 100% modulus | 305 | 305 | 325 | 535 | 530 | 545 | 505 |
| 300% modulus | — | — | 610 | 1100 | 1090 | 1055 | — |
| Tensile | 480 | 510 | 635 | 1270 | 1170 | 1055 | 925 |
| Elongation | 265 | 280 | 325 | 420 | 350 | 300 | 290 |

In the practice of this invention, the copolymer of propylene oxide containing unsaturation therein is conveniently sulfur-vulcanized by the addition of about 0.3 to about 5, preferably about 0.5 to about 2, parts sulfur per 100 parts copolymer by weight (phr) and curing the mixture at a temperature in the range of about 135° C. to about 205° C. for a corresponding time range of about 2 hours to about 3 minutes.

While certain representative embodiments and details have been shown for the purpose of illustrating the invention, it will be apparent to those skilled in this art that various changes and modifications may be made therein without departing from the spirit or scope of the invention.

I claim as my invention:

1. A heat age resisting composition comprising (A) 100 parts by weight of a rubbery sulfur-cured copolymer of propylene oxide containing from about 70 to about 97 percent units derived from propylene oxide and correspondingly from about 30 to about 3 percent units derived from monomers selected from allyl glycidyl ether and unsaturated monoepoxides containing 4 to about 10 carbon atoms in admixture with (B) about 1 to about 20 parts by weight of a synergistic mixture of a nickel dialkyl dithiocarbamate and an imidazole selected from 2-mercaptobenzimidazole and its metal salt where the ratio of the carbamate units to imidazole units is in the range of from about 25/1 to about 1/12, where the alkyl radical of the carbamate is a saturated alkyl radical containing 1 to 8 carbon atoms and where the rubbery copolymer has a molecular weight of at least about 500,000.

2. The composition of claim 1 where the rubbery polymer is selected from polypropylene oxide and copolymers containing from about 85 to about 95 percent units derived from propylene oxide and correspondingly from about 15 to about 5 units derived from allyl glycidyl ether, where the rubbery polymer has a molecular weight in the range of about 750,000 and about 10,000,000, is characterized by having a glass transition temperature in the range of about −60° C. to about −75° C. according to ASTM test D746 and ultimate tensile and elongation at about 25° C. according to normal rubber testing procedure of about 1500 to about 3500 pounds per square inch and about 200 to about 1100 percent, respectively, where the composition contains from about 1 to 20 parts by weight per 100 parts by weight of the rubbery polymer of a heat age resisting mixture of nickel dibutyl dithiocarbamate and an imidazole selected from 2-mercaptobenzimidazole and metal salts of 2-mercaptobenzimidazole where the metals are selected from nickel, iron, manganese, zinc, cobalt and tin.

3. The composition of claim 10 where the ratio of carbamate units to imidazole units is in the range of from about 8:1 to about 1:12, where the copolymer of propylene oxide contains units derived from propylene oxide and units derived from monomers selected from allyl glycidyl ether, 1,7-octadiene monoepoxide, 1,6-heptadiene monoepoxide, 1,4-pentadiene monoepoxide, 1,5-hexadiene monoepoxide and 1,3-butadiene monoepoxide, and where the said rubbery polymer has a molecular weight in the range of about 750,000 to about 10,000,000.

4. The composition of claim 3 characterized by having an improved resistance to heat aging in a temperature range of from about 100° C. to about 170° C.

5. The composition of claim 3 comprising from about 0.5 to about 20 parts by weight of the carbamate and imidazole heat age resisting mixture per 100 parts by weight of the rubbery polymer.

6. The composition of claim 3 where the metal 2-mercaptobenzimidazole is represented by the formula:

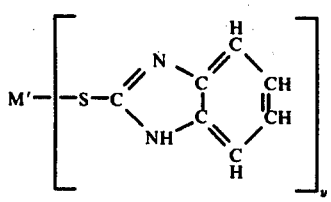

where M' is a metal having a valence of 1 to 4 and $y$ is equal to the valence of M'.

7. The composition of claim 6 where alkyl radical of the carbamate is selected from methyl, ethyl, n-propyl, isopropyl, n-butyl, isobutyl, t-butyl, pentyl, isopentyl, hexyl, isohexyl, t-hexyl, 2-ethyl hexyl, octyl and cyclohexyl, and where M' of the imidazole is selected from nickel, lithium, potassium, manganese, zinc, selenium, sodium, cadmium, barium, calcium, titanium, chromium, cesium, beryllium, magnesium, cobalt, strontium, lead, mercury, tin, antimony, iron and tellurium.

8. The composition according to claim 6 where the carbamate is nickel dibutyl dithiocarbamate and M' of the imidazole is selected from nickel, iron, manganese, zinc, cobalt, and tin.

* * * * *